(12) United States Patent
Capogna

(10) Patent No.: US 9,580,145 B2
(45) Date of Patent: *Feb. 28, 2017

(54) ACTUATOR DEVICE FOR A BICYCLE GEARSHIFT AND NUT FOR SUCH A DEVICE

(71) Applicant: Campagnolo S.r.l., Vicenza (IT)

(72) Inventor: Andrea Capogna, Fimon-Arcugnano (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,808

(22) Filed: Jun. 12, 2015

(65) Prior Publication Data

US 2015/0274255 A1    Oct. 1, 2015

Related U.S. Application Data

(63) Continuation of application No. 13/316,068, filed on Dec. 9, 2011, now Pat. No. 9,102,379.

(30) Foreign Application Priority Data

Dec. 9, 2010    (EP) .................................... 10015475

(51) Int. Cl.
*B62M 9/128*    (2010.01)
*B62M 9/1242*   (2010.01)
(Continued)

(52) U.S. Cl.
CPC .............. *B62M 9/128* (2013.01); *B62M 9/122* (2013.01); *B62M 9/1242* (2013.01); *B62M 9/132* (2013.01); *B62M 25/08* (2013.01)

(58) Field of Classification Search
CPC ....... B62M 9/122; B62M 9/126; B62M 25/08; B62M 9/1242
(Continued)

(56) References Cited

U.S. PATENT DOCUMENTS 5,127,285 A * 7/1992 Granhom ................. B23Q 5/40
                                                    74/527
5,328,414 A    7/1994 Restelli
(Continued)

FOREIGN PATENT DOCUMENTS

CN    1356235 A    7/2002
CN    1579876 A    2/2005
(Continued)

OTHER PUBLICATIONS

Office Action issued in corresponding Japanese Patent Application No. 2011-268541 on Mar. 10, 2015, consisting of 3 pp. English Translation Provided.
(Continued)

*Primary Examiner* — William E Dondero
*Assistant Examiner* — Mark K Buse
(74) *Attorney, Agent, or Firm* — Volpe and Koenig, P.C.

(57) ABSTRACT

An actuator device for a bicycle gearshift, comprising an actuation kinematic mechanism adapted to be deformed in order to move a derailleur of the gearshift; a driving member adapted to control the deformation of the aforementioned kinematic mechanism, the driving member comprising a motor and a threaded drive shaft put in rotation by the motor; a nut associated with the aforementioned kinematic mechanism and with the drive shaft. The actuator device comprises a snap mechanism that, in a first operative configuration, holds the nut in an engaged condition with the drive shaft such that the rotation of the drive shaft causes the deformation of the actuation kinematic mechanism and that, when the actuator device is subjected to a force greater than a predetermined threshold force, defines a release configuration in the nut, such that the rotation of the drive shaft does not cause the deformation of the actuation kinematic mechanism.

34 Claims, 5 Drawing Sheets

(51) Int. Cl.
*B62M 25/08* (2006.01)
*B62M 9/122* (2010.01)
*B62M 9/132* (2010.01)

(58) Field of Classification Search
USPC .......................................... 474/70, 78, 80, 82
See application file for complete search history.

(56) References Cited

U.S. PATENT DOCUMENTS

| | | | |
|---|---|---|---|
| 5,358,451 A | | 10/1994 | Lacombe et al. |
| 5,494,307 A | | 2/1996 | Anderson |
| 7,086,974 B2 | * | 8/2006 | Dal Pra .................. B62M 9/122 474/78 |
| 7,255,660 B2 | * | 8/2007 | Del Pra .................. B62M 9/122 474/82 |
| 8,033,937 B2 | * | 10/2011 | Meggiolan ............. B62M 9/132 474/70 |
| 8,282,519 B2 | * | 10/2012 | Ichida .................... B62M 25/08 474/82 |
| 2003/0027674 A1 | * | 2/2003 | Valle ...................... B62M 25/08 474/70 |
| 2004/0014541 A1 | * | 1/2004 | Dal Pra .................. B62M 9/122 474/70 |
| 2005/0199083 A1 | | 9/2005 | Meggiolan |
| 2005/0266945 A1 | * | 12/2005 | Meggiolan ............. B62M 9/132 474/70 |
| 2006/0199688 A1 | * | 9/2006 | Dal Pra .................. B62M 9/122 474/70 |
| 2008/0132364 A1 | * | 6/2008 | Ichida .................... B62M 25/08 474/70 |

FOREIGN PATENT DOCUMENTS

| | | |
|---|---|---|
| EP | 0412072 A2 | 2/1991 |
| EP | 1357023 A1 | 10/2003 |
| EP | 1504989 A1 | 2/2005 |
| EP | 1970299 A2 | 9/2008 |
| JP | H03-069843 A | 3/1991 |
| JP | H05-338581 A | 12/1993 |
| JP | H07-257472 A | 10/1995 |
| JP | 2004-001728 A | 1/2004 |
| JP | 2005-053480 A | 3/2005 |
| JP | 2005-239149 A | 9/2005 |
| JP | 2007137192 A | 6/2007 |

OTHER PUBLICATIONS

Office Action issued in corresponding Chinese Patent Application No. 201110409340.6 on Oct. 13, 2014, consisting of 9 pp. English Translation Provided.

European Search Report, Appln. No. EP 10015475.6-1254, dated May 18, 2011.

* cited by examiner

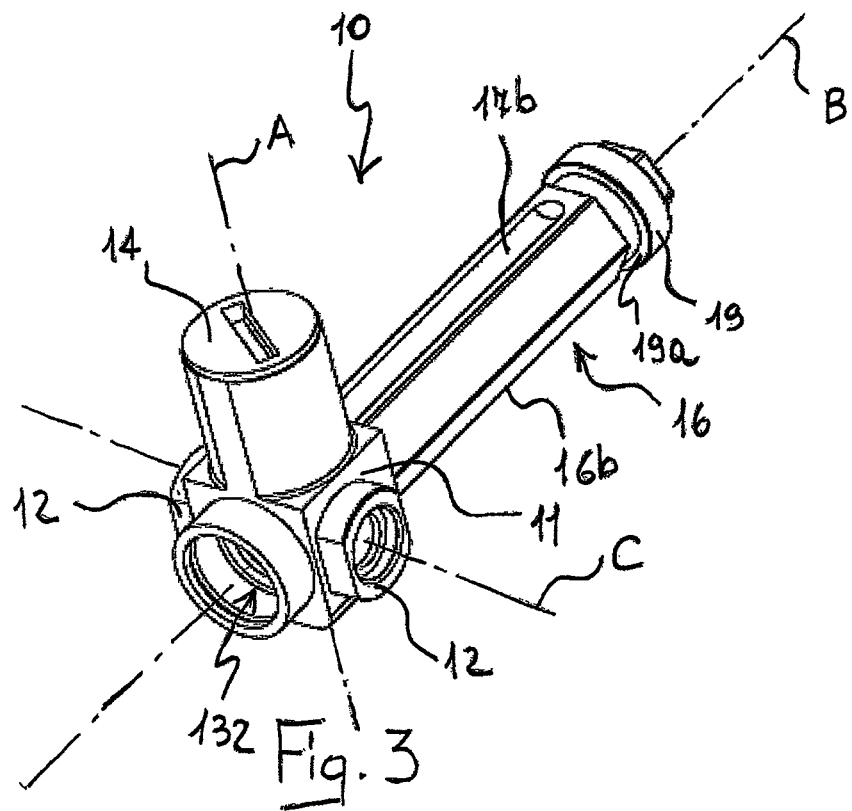
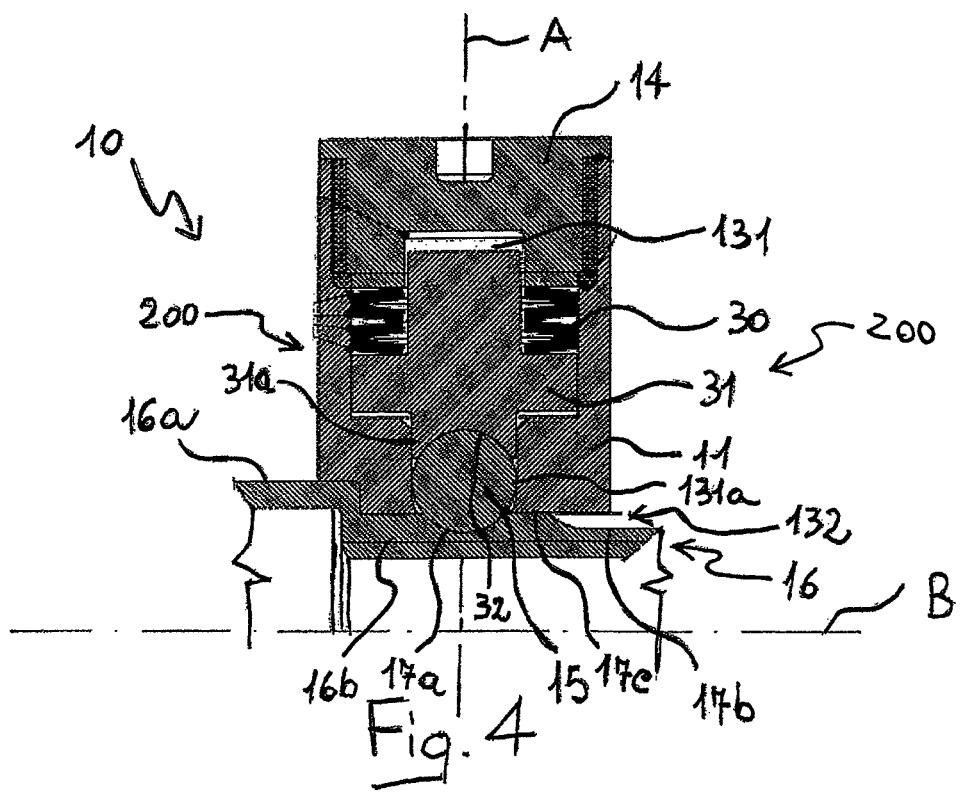

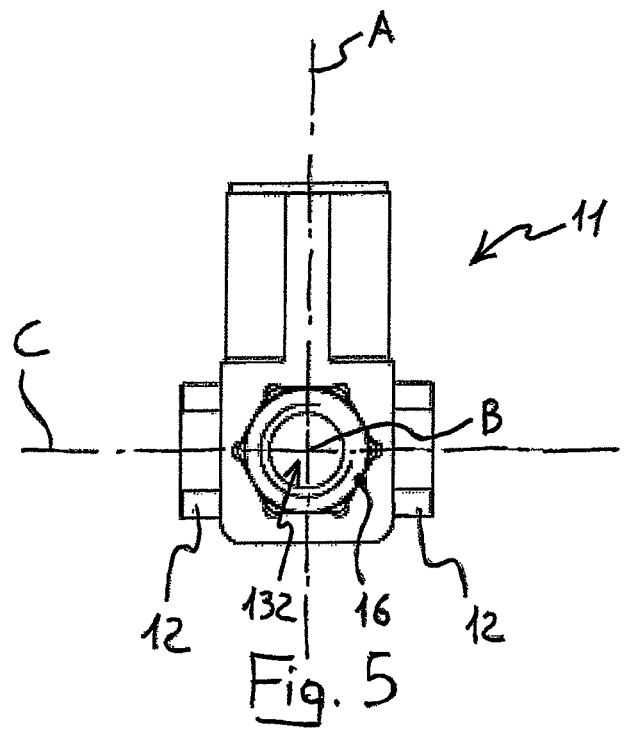
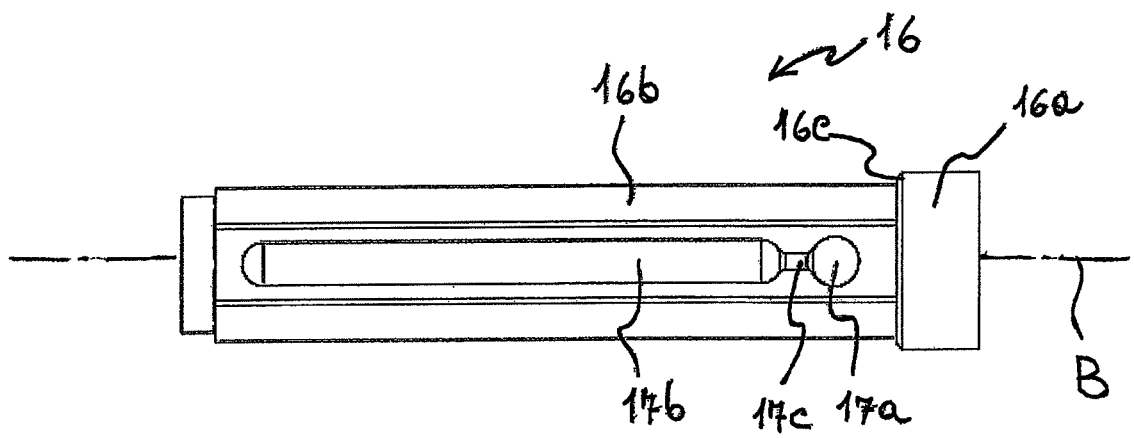
Fig. 5
Fig. 6

US 9,580,145 B2

ACTUATOR DEVICE FOR A BICYCLE GEARSHIFT AND NUT FOR SUCH A DEVICE

INCORPORATION BY REFERENCE

This application is a continuation of U.S. patent application Ser. No. 13/316,068, filed Dec. 9, 2011, which claims priority from EP Application 10015475.6, filed Dec. 9, 2010, both of which are incorporated by reference as if fully set forth.

FIELD OF THE INVENTION

The present invention relates to both to an actuator device for a bicycle gearshift and to a nut for such a device. The invention is useful with a gearshift which moves the chain between the different sprockets associated with the rear wheel of the bicycle, or front one which moves the chain between the different crowns associated with the crank arms.

BACKGROUND OF THE INVENTION

In relatively recent times bicycle gearshifts with motorised actuation have been marketed, wherein the movement of the derailleur takes place through a driving member that is suitably controlled, typically electrically.

In the development of these gearshifts, a great deal of attention has obviously been given to the quality of the actuation, intended as the ability of the gearshift to carry out gear-shifting quickly and precisely at least to the same degree as a conventional manually-actuated gearshift.

However, even in normal use, the performance of a gearshift with motorised actuation is often compromised by even minor damage, which is often the result of knocks received by the gearshift itself.

Indeed, in gearshifts of this type the actuation kinematic mechanism is a system mechanically fixed to the driving member. In the case of knocks, due for example to the bicycle falling down or even to manoeuvres of loading, unloading and transportation on a vehicle, the gearshift can suffer damage of various degrees. A particularly severe knock can in the most serious cases cause some members of the gearshift to be broken; less severe knocks can on the other hand cause small deformations or even just small mutual displacements of the members of the gearshift, often not even immediately noticeable to the eye, but nevertheless such as to compromise the precision and therefore the correct operation of the gearshift. The same deformations or mutual displacements can in other cases be caused during gear-shifting by temporary locking of the kinematic mechanism with respect to the driving member, as sometimes occurs following mechanical interference between the chain and the sprockets (particularly when passing from one sprocket to another having a greater diameter).

Therefore, actuator devices have been developed which are provided with systems for protecting the gearshift against knocks or undesired temporary deformations/displacements. Such knocks or undesired temporary deformations/displacements are, for the sake of brevity, indicated hereafter with the expression "excess forces".

One prior art solution an actuator device for a motorised gearshift wherein the motion provided by the motor is transferred to the actuation kinematic mechanism through a plurality of gear wheels. In order to provide protection against possible excess forces, a clutch device is provided between the actuation kinematic mechanism and the motor, the clutch device consisting of a driving member fixedly connected to the shaft of the motor, a driven member fixedly connected to the actuation kinematic mechanism and a torsion spring that pushes the driven member against the driving member. The driven member comprises a tooth that, in normal operating conditions, is housed in a seat formed in the driving member. In the presence of an excess force, a rotation force is generated on the driven member that exceeds a predetermined threshold. Such a force causes a relative rotation between driven member and driving member and the consequent slipping of the tooth out of the seat. The excess force is thus absorbed by the system thus preventing it from being transferred to the members of the actuation kinematic mechanism. The coupling surfaces of the tooth and of the driving member are shaped so that, when the tooth is out of the seat, there is a sufficiently large mutual contact area. This is to allow the normal operation of the gearshift even in this operative condition. The Applicant has observed that the plurality of gear wheels between motor and actuation kinematic mechanism makes the suggested device particularly complicated from the constructive point of view, as well as excessively bulky.

An improved actuator having elastically yielding protecting against excess forces is disclosed in Applicant's recently issues U.S. Pat. No. 8,033,937. In such an actuator device, the actuation kinematic mechanism has a nut associated therewith and the nut in turn is directly engaged with the drive shaft. The nut is provided with a preloaded spring arranged coaxially to the drive shaft. In a first operative configuration of the actuator device, the nut is in an engaged condition with the drive shaft such that the rotation of the drive shaft causes the deformation of the actuation kinematic mechanism. In the presence of an excess force, the spring deforms absorbing the excess force, thus avoiding it from being transferred to the members of the actuation kinematic mechanism. The spring is associated, at an end thereof, with a collar that, under a particularly high excess force, yields.

The Applicant has observed that in an actuator device of the type described above the breaking of the collar under a particularly high excess force causes the need to replace the nut, as well as the risk of damaging the members of the gearshift and/or of the bicycle due to the presence of mechanical pieces, like the collar and the spring, which are free to move without any constraint.

The Applicant has also observed that, in the actuator device described above, the spring, although deforming, still continues to exert a reaction to the excess forces. Therefore, under an excess force lasting a long time, the members of the actuation kinematic mechanism still remain subjected to a stress given by the resultant between the excess force and the reaction of the spring.

The technical problem addressed by the present invention is the provision of an actuator device that is constructively simple and with low bulk, provided with an effective system for protecting against knocks and that does not have the aforementioned drawbacks.

DESCRIPTIONS OF THE PREFERRED EMBODIMENTS

Introduction

The present invention therefore relates, in a first aspect thereof, to an actuator device for a bicycle gearshift, comprising:

an actuation kinematic mechanism adapted to be deformed in order to move a derailleur of the gearshift;

a driving member adapted to control the deformation of the actuation kinematic mechanism, the driving member comprising a motor and a threaded drive shaft put in rotation by the motor;

a nut associated with the actuation kinematic mechanism and with the drive shaft so that, in a first operative configuration of the actuator device, the nut is in an engaged condition with the drive shaft such that the rotation of the drive shaft causes the deformation of the actuation kinematic mechanism;

characterised in that it comprises a snap mechanism that, in said first operative configuration of the actuator device, holds the nut in said engaged condition and that, when the actuator device is subjected to a force greater than a predetermined threshold force, defines a release configuration in the nut such that the rotation of the drive shaft does not cause the deformation of the actuation kinematic mechanism.

Throughout the present description and in the subsequent claims, the expression "snap mechanism" is used to indicate any mechanism capable of controlling the sudden passage from a first operative configuration to a different configuration and vice-versa. The use of a snap mechanism at the coupling between nut and drive shaft allows the complete release of the articulation kinematic mechanism from the rest of the actuator device in the presence of a force greater than a predetermined threshold force. Knocks or undesired temporary deformations/displacements of a certain degree are therefore totally absorbed by the snap mechanism, thus avoiding them from being transmitted to the members of the actuation kinematic mechanism or the other members of the actuator device.

The snap mechanism, being a reversible mechanism, also allows the original operative configuration to be restored (i.e. the return to the condition before the release) without leaving residual deformations that could easily disturb the operation of the gearshift and without the need to replace any piece. Indeed, there is no yielding or breaking of mechanical pieces and there are also no mechanical pieces that, being free to move without any constraint (because they are broken or no longer held in position), can accidentally knock against the members of the gearshift and/or of the bicycle, damaging them.

The use of a snap mechanism, in the case of failure or locking of the gearshift, also allows a manual movement of the actuation kinematic mechanism to be carried out, thus always being able to set the desired transmission ratio. It is also possible to obtain greater ease of mounting and dismounting of the wheel, in the case of a rear gearshift. Indeed, the release can be exploited by the user to facilitate the engagement or the disengagement of the chain from the sprockets.

Preferably, the nut comprises:

a tubular body provided with a first cavity extending along a first direction and with a second cavity extending along a second direction perpendicular to said first direction;

two opposite pin portions, fixedly connected to the tubular body and extending along a third direction perpendicular to said first direction and to said second direction;

a tubular sleeve, internally threaded, adapted to engage with the drive shaft and slidably inserted in the tubular body along said second direction;

wherein the snap mechanism is active between the tubular body and the tubular sleeve along said first direction.

Advantageously, the release takes place inside the nut, thus without any need to provide for a specific design intervention on the other components of the actuator device. Moreover, the snap mechanism is active along a direction perpendicular to that of movement of the nut during gear-shifting, thus avoiding any interference between release and gear-shifting.

In addition thereof, such a nut can also operatively replace a conventional nut, allowing an existing actuator device to be modified in an actuator device according to the invention.

Preferably, in said operative configuration the snap mechanism holds the tubular body in a predetermined operative position with respect to the tubular sleeve and in said release configuration the snap mechanism allows the tubular body to move freely from said predetermined operative position along said second direction.

Throughout the present description and in the subsequent claims, the expression "move freely" (or "free movement" or other similar expressions) is used to indicate a movement without counteraction (disregarding the friction). In this specific case, therefore, in the release configuration there is a relative movement of two components of the nut (tubular body and tubular sleeve) along a predetermined direction (second direction) without such a relative movement being in any way counteracted.

Advantageously, the snap mechanism described above makes it possible to manually activate the release configuration and/or to keep such a release configuration (activated manually or following a knock or undesired movement/deformation) up to when it is wished to restore the original operative configuration. It may for example be advantageous to deliberately activate the release configuration before carrying out manoeuvres of loading, unloading and transportation of the bicycle on a vehicle, or before and after the bicycle is used. In a preferred embodiment of the actuator device of the present invention, the snap mechanism comprises:

a ball at least partially housed in the first cavity of the tubular body;

a preloaded spring, housed in the first cavity of the tubular body and acting on said ball to push it towards the tubular sleeve along said first direction;

a first housing seat for said ball, provided on the tubular sleeve, said first housing seat being adapted to partially house the ball in said operative configuration;

at least one second housing seat for said ball, provided on the tubular sleeve in a position adjacent to said first housing seat along said second direction, said at least one second housing seat being adapted to partially house the ball in said release configuration.

By the term "spring" it is generically intended to indicate an element capable of providing an elastic reaction of any kind: by traction, compression, torsion, bending. It can for example be a metallic helical spring, a metallic torsion spring, a metallic Belleville spring, a flexible foil, an air spring, a variously shaped elastomeric spring, and the like. By the adjective "preloaded" it is intended to indicate that the spring is used in a pre-biased state, for example pre-compressed or else pre-stretched, so that at rest it exerts an elastic stress different from zero, equal to the desired threshold force. The spring is thus in conditions such as to elastically yield only if the force discharged onto it is above the predetermined threshold force value, like in the case of a knock; if, on the other hand, the force discharged is less, like in the case of normal use of the gearshift, the spring does not yield. In this last condition, therefore, the spring behaves like a substantially rigid body and its yielding does not interfere with the normal operation of the gearshift.

Should one wish to widen the range of operation in which the system responds readily, the threshold force is advantageously chosen high. On the other hand, should one wish to allow the device to also absorb small knocks, the threshold force is chosen with a lower value, although in this way reducing the range in which the system responds readily. The degree of the threshold force can easily be determined, both by suitably sizing the spring, and causing its correct compression with a suitable selection of the length of the tubular body; spacer rings of different thickness can be useful for particularly fine adjustment of the compression.

Advantageously, the snap mechanism causes the passage of the aforementioned ball from a first seat to a second seat. Therefore, also in the release configuration (ball in the second seat), the nut maintains its structural integrity that allows the initial configuration to be restored without any need to replace pieces.

Preferably, said at least one second housing seat is defined by a groove extending along said second direction. In this way, when going to the release configuration the ball is left a sufficient freedom of travel along the aforementioned second direction, avoiding it being held in a predetermined position along said second direction.

More preferably, such a groove has a length at least equal to half the length of the tubular sleeve.

Preferably, the first housing seat is separated from said at least one second housing seat by a raised portion (or hill) of the tubular sleeve and connected to them through respective bevelled joining surfaces. In this way it is made easier to pass from the operative configuration to the release configuration, and vice-versa, leaving the reaction to knocks or undesired movement/deformation exclusively to the preload of the spring.

Preferably, the tubular body comprises a pressure element sliding in the cavity and a cover for closing the cavity, said spring acting by thrusting between said pressure element and said cover.

Advantageously, the closing cover has the dual function of preventing dirt from entering into the tubular body and creating the upper abutment to keep the spring in the preloaded condition. The pressure element, on the other hand, has the function of pushing the ball and creating the lower abutment to keep the spring in the aforementioned preloaded condition.

In a first embodiment of the actuator device of the present invention, the cover is associated with the tubular body through respective threadings and the position of said cover with respect to the tubular body is adjustable through screwing. In this way it is possible to adjust the preload of the spring, consequently varying the predetermined threshold value.

In an alternative embodiment of the actuator device of the present invention, the cover is associated with the tubular body through press fitting and the position of said cover with respect to the tubular body is unique and predetermined. The preload of the spring is in this case equal to a unique value set at the design stage.

Preferably, the tubular sleeve has an at least partially polygonal outer section, which matches a polygonal inner section of the tubular body. In this way the nut is prevented from also being able to rotate into the release configuration.

Preferably, the tubular sleeve, at an end portion thereof, comprises a removable closing cap. Such a cap prevents dirt from entering into the tubular sleeve.

Preferably, the closing cap comprises an abutment collar adapted to prevent the tubular body from slipping out at said release configuration.

In a second aspect thereof, the present invention relates to a nut for an actuator device for a bicycle gearshift, such a nut comprising:

a tubular body provided with a first cavity extending along a first direction and with a second cavity extending along a second direction perpendicular to said first direction;

two opposite pin portions, fixedly connected to the tubular body and extending along a third direction perpendicular to said first direction and to said second direction;

a tubular sleeve, internally threaded, adapted to engage with a drive shaft of a motor of the actuator device, said tubular sleeve being slidably inserted in the tubular body along said second direction;

characterised in that it comprises a snap mechanism, acting between the tubular body and the tubular sleeve, which defines a first operative configuration in which the tubular body is held in a predetermined operative position with respect to the tubular sleeve and a release configuration in which the tubular body is free to move from said predetermined operative position along said second direction.

Advantageously, such a nut can be used in the actuator device of the present invention described above.

Further characteristics and advantages of the present invention will become clearer from the following detailed description made with reference to the attached drawings wherein:

FIG. 3 is a perspective view of a nut in accordance with the present invention, used in the device of FIG. 1;

FIG. 4 is a section view of an enlarged portion of the nut of FIG. 3;

FIG. 5 is a side view of a first constructive detail of the nut of FIG. 3;

FIG. 6 is a plan view of a sleeve element used with the nut of FIG. 3;

DETAILED DESCRIPTIONS OF THE PREFERRED EMBODIMENTS

Figure 1:
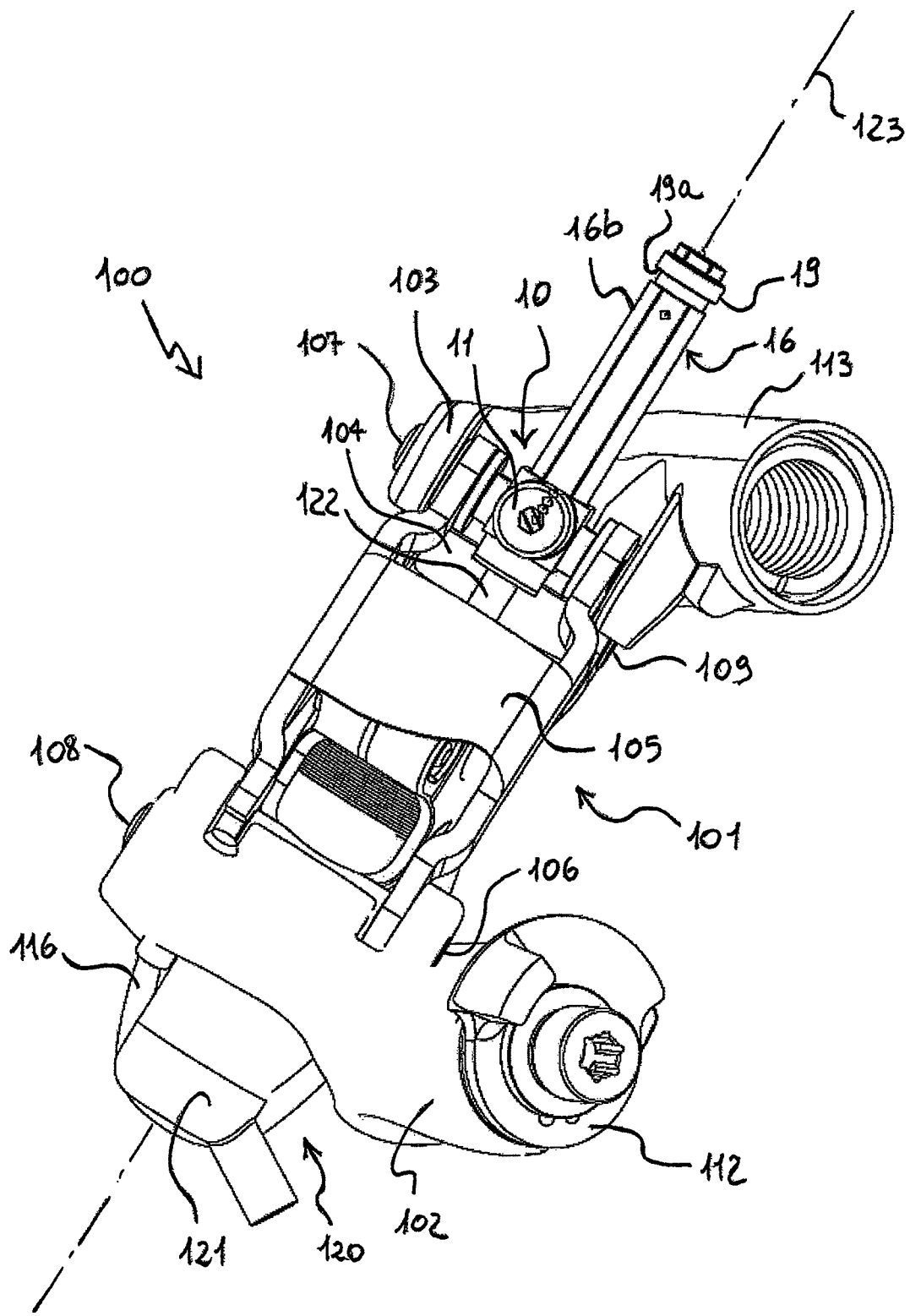
FIG. 1 is a perspective view of an actuator device in accordance with the present invention.
Figure 2:
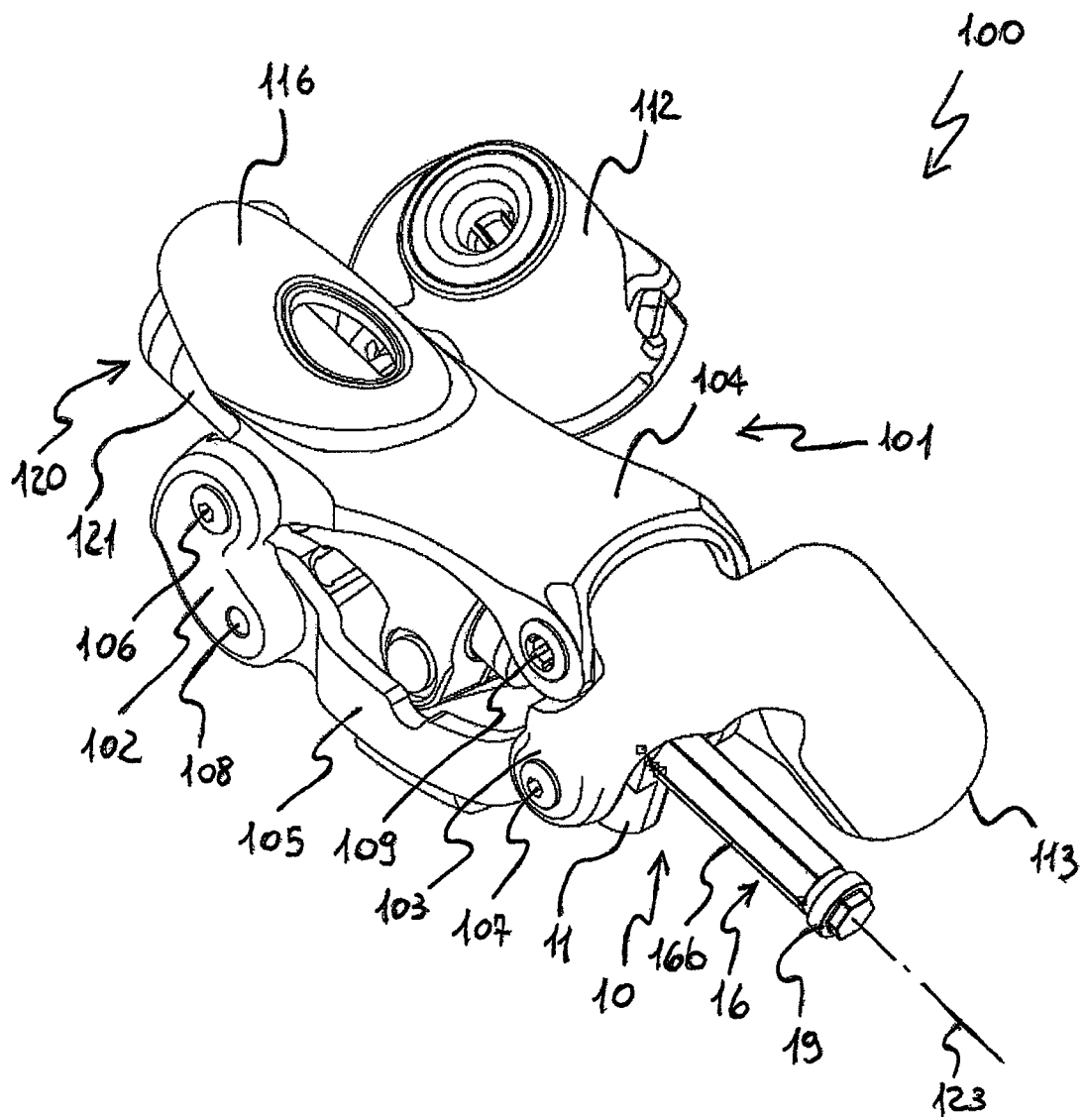
FIG. 2 is a perspective view showing the underside of the device of FIG. 1.

In FIGS. 1 and 2, an actuator device for a bicycle gearshift, particularly a rear gearshift, according to a preferred embodiment of the present invention, is indicated with 100.

The device 100 comprises an actuation kinematic mechanism 101 shaped like an articulated quadrilateral, more precisely an articulated parallelogram, adapted to be moved by a driving member 120 and, in turn, to move a normal derailleur (not illustrated) of a rear gearshift of a bicycle. In alternative embodiments (not illustrated) the articulated quadrilateral can be a trapezium instead of a parallelogram.

The kinematic mechanism 101 comprises four connecting rods articulated together by four pin elements. The connecting rods comprise a first connecting rod 102 associated with a support 112 for attachment onto a bicycle frame, a second connecting rod 103 opposite the first connecting rod 102 and associated with a support 113 for the attachment of the derailleur, a third connecting rod 104 and a fourth connecting rod 105. The pin elements comprise a first pin element 106 (between the first connecting rod 102 and the third connecting rod 104), a second pin element 107 opposite the first one (between the second connecting rod 103 and the fourth connecting rod 105), a third pin element 108 (between the first connecting rod 102 and the fourth connecting rod 105) and a fourth pin element 109 opposite the third one (between the second connecting rod 103 and the third connecting rod 104).

A support 116 for the driving member 120 is associated with the first pin element 106. It should be noted that the term "associated" referring to a member in relation to a pin element or to a connecting rod here and hereafter it is used to indicate that such a member is mechanically connected to the pin element or to the connecting rod, or else it is formed in one piece with it, or furthermore that such a member is configured in such a way as to be able to carry out the functions of the pin element or of the connecting rod.

The driving member 120 comprises an electric motor 121 (fed and controlled by means of cables and control members not illustrated in the Figures) provided with a threaded drive shaft 122, extending along a driving axle 123 and put in rotation by the motor 121. In the illustrated example, the support 116 is substantially cradle-shaped, so as to be able to house the motor 121 with the driving axle 123 substantially at the axis of the pin 106.

The driving member 120 is coupled with the kinematic mechanism 101 by means of a nut 10, in screwing engagement with the threaded drive shaft 122 and associated with the second pin element 107. Through the nut 10 and the support 116, the driving member 120 is able to move the kinematic mechanism 101, lengthening or shortening the diagonal between the pin elements 106 and 107. In particular, given that the device 100 is used in a rear gearshift of a bicycle, a lengthening of such a diagonal will be used to carry out upwards gear-shifting (towards an inner sprocket of the sprocket assembly, with a greater diameter), whereas vice-versa a shortening of the diagonal will be used for downwards gear-shifting (towards an outer sprocket of the sprocket assembly, with a smaller diameter).

In accordance with the invention, the nut 10 (better illustrated in FIGS. 3 and 4) comprises a tubular body 11 extending along a direction A and comprising two identical pin portions 12 that are aligned opposite to one another and extending along a direction C substantially perpendicular to the direction A. The pin portions 12 are fixedly connected to the tubular body 11 or preferably formed in one piece with it and are adapted to be associated with the pin 107 of the articulation kinematic mechanism 101.

As illustrated in FIG. 4, the tubular body 11 is provided with an inner cavity 131 having a circular section, passing through and extending along the direction A. Such a cavity 131 is closed, at an end thereof, by a cover 14. The tubular body 11 is also provided with a second inner cavity 132 having a polygonal section, passing through and extending along a direction B perpendicular to the directions A and C (see also FIG. 5).

The cavity 131 has a portion 131a of reduced section that at least partially houses a ball 15. Inside the cavity 131 a spring 30 and a pressure element 31 slidably associated with the wall of the cavity 131 are provided.

The spring 30 is arranged in a preloaded condition between the cover 14 and the pressure element 31 to push the pressure element 31 away from the cover 14.

At an opposite end to that of coupling with the spring 30, the pressure element 31 has a portion 31a with reduced section sliding inside the portion 131a with reduced section of the cavity 131. The portion 31a with reduced section of the pressure element 31, at a free end thereof, has a seat 32 with a shape matching the surface of the ball 15. Due to the preload of the spring 30, the ball 15 is thrusted by the portion 31a of the pressure element 31 away from the cover 14, so as to at least partially project into the cavity 132 of the tubular body 11.

The spring 30 illustrated is a metallic helical spring; instead of such a spring a tubular elastomeric spring or any other spring capable of exerting the same thrusting action in the nut 10 could be used. The choice, sizing and compression of the spring 30 are carried out depending on the protective action that the nut 10 must provide inside the actuator device in which it is mounted, as will be described better hereafter.

Figure 7:
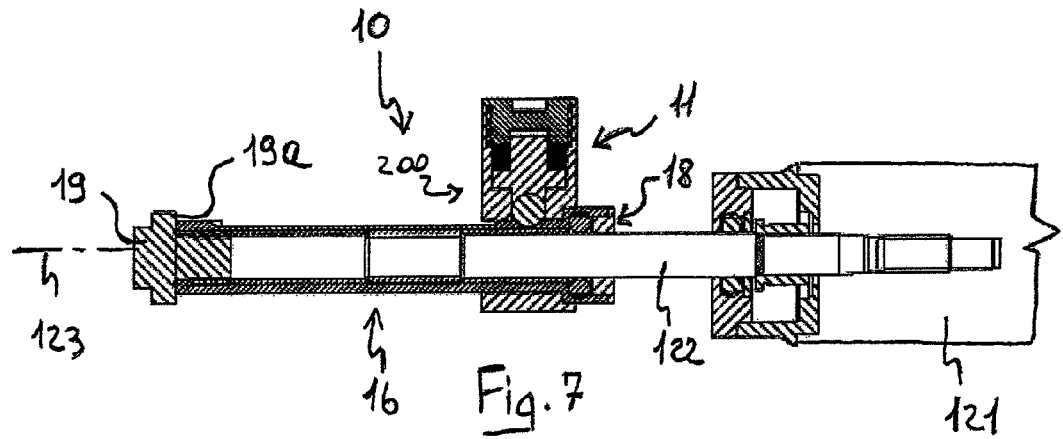
FIG. 7 is a section view illustrating a first embodiment of the nut of FIG. 3, in a first operative configuration.
Figure 8:
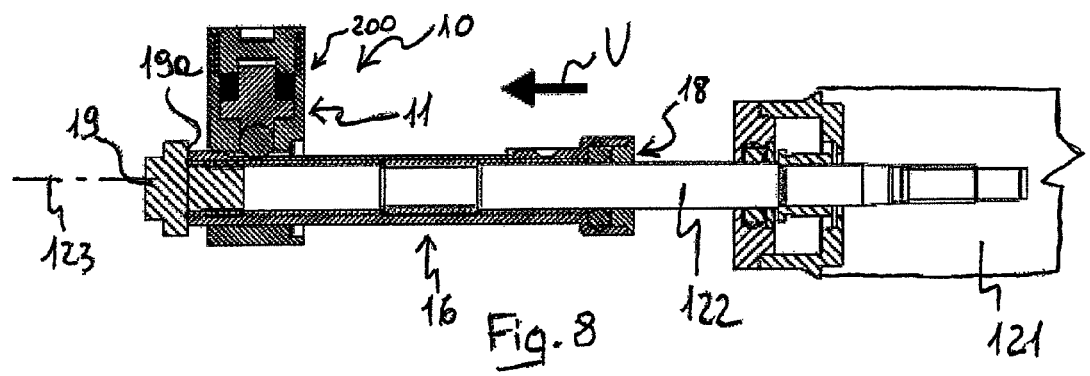
FIG. 8 illustrates the nut of FIG. 7 in a second operative configuration.

FIGS. 7 and 8 illustrate the behaviour of the tubular body 11 of FIG. 3 when the actuator device 100 of the present invention is subjected to a stress greater than a predetermined threshold value. Such behaviour will be described in detail hereafter in the present description.

Figure 9:
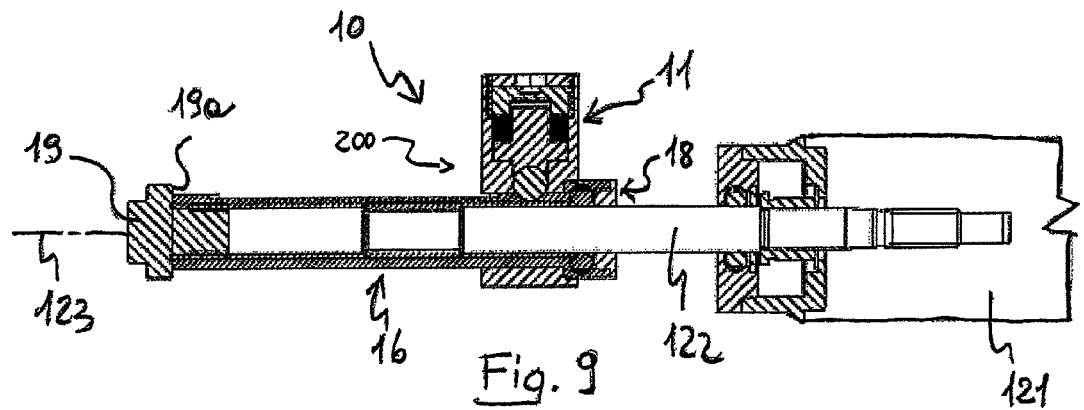
FIG. 9 is a section view illustrating a second embodiment of the nut of FIG. 3, in a first operative configuration; and, FIG. 10 is a section view illustrating the nut of FIG. 9 in a second operative configuration.
Figure 10:
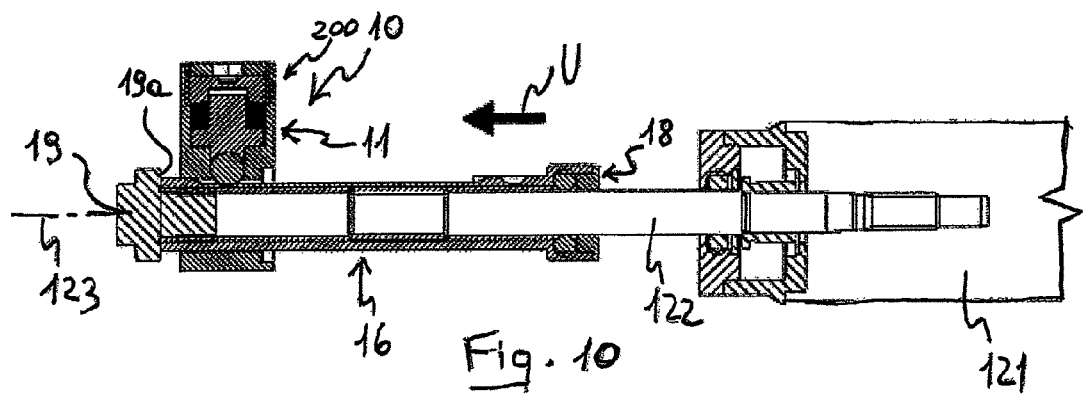

FIGS. 9 and 10 are analogous to FIGS. 7 and 8 but relate to an alternative embodiment of the nut 10 of the present invention. Such a nut differs from the one described in depth here and illustrated in the other Figures due to the different structural configuration of the tubular body 11.

In particular, in the embodiment illustrated in FIGS. 4, 7 and 8, the cover 14 is associated with the tubular body 11 through press fitting in a unique and predetermined relative position. In the embodiment of FIGS. 9 and 10, the cover 14 and the tubular body 11 have respective threadings, so that the cover 14 is screwed onto the tubular body 11. therefore, by screwing the cover 14 more or less deeply onto the tubular body 11 it is possible to adjust the preload of the spring 30 and thus the thrust on the ball 15. With respect to the other features, the embodiment of FIGS. 9 and 10 is identical to the embodiment of FIGS. 4, 7 and 8.

The nut 10 also comprises a tubular sleeve 16 provided with an inner threading matching the outer threading of the drive shaft 122, so as to allow the engagement between the drive shaft 122 and the nut 10.

As illustrated in FIG. 6, the sleeve 16 extends along the longitudinal axis (which, in use, coincides with the driving axle 123 of the derailleur 100 and with the direction B of the tubular body 11) and has a portion 16a with a circular outer surface and a remaining portion 16b with a polygonal outer surface (hexagonal in the illustrated example). The portion 16a has a greater outer diameter than the diameter of the ideal circumference circumscribing the cross section of the portion 16b. In this way, the portion 16a, at the transition section to the portion 16b, defines an abutment surface 16c for the tubular body 11.

The tubular sleeve 16 slides in the inner cavity 132 of the tubular body 11, as illustrated in FIGS. 7 to 10. As illustrated in FIG. 3 and even better in FIG. 5, the outer surface of the portion 16b matches the section of the inner cavity 132, so as to allow the sleeve 16 inserted in the cavity 132 of the tubular body 11 to be able to slide along the direction B but not to rotate around such a direction.

As illustrated in FIGS. 4 and 6, on one of the faces of the polygonal outer surface of the tubular sleeve 16 and in a position adjacent to the portion 16a along the direction B a seat 17a is formed having a shape matching the surface of the ball 15. On a side of the seat 17a along the direction B a longitudinal groove or seat 17b is formed having a length greater than half the length of the tubular sleeve 16, preferably equal to, or greater than, two-thirds the length of the tubular sleeve 16.

The seats 17a and 17b are separated by a hill 17c defined by a raised portion of the tubular sleeve 16. As illustrated in FIG. 4, the hill 17c joins to the seats 17a and 17b through respective bevelled surfaces.

The assembly comprising ball 15, pressure element 31, spring 30 and cover 14 of the tubular body 11, together with seat 17a, seat 17b and hill 17c of the tubular sleeve 16 defines a snap mechanism 200 in the nut 10 (FIG. 4) that, as better described hereafter, allows the derailleur 100 to move from an operative configuration in which the ball 15 is housed in the seat 17a and the rotation of the drive shaft 122 causes the deformation of the actuation kinematic mechanism 101, and thus the gear-shifting (FIGS. 3, 4, 7 and 9), to a release configuration in which the ball 15 is housed in the seat 17b and the rotation of the drive shaft does not cause the deformation of the actuation kinematic mechanism 101 (FIGS. 8 and 10). The passage of the ball from the seat 17a to the seat 17b through the hill 17c is permitted by the yielding of the spring 30.

FIGS. 7 to 10 show how at the free end of the portion 16a a removable closing cap 18 is provided, such a cap being bored to allow the shaft 122 of the driving member 120 to pass. At the free end of the portion 16b there is a further removable closing cap 19, provided with an abutment collar 19a to prevent the tubular body 11 from slipping out from the tubular sleeve 16 when the ball 15 is housed in the seat 17b.

In the device 100, it is necessary to avoid that a knock against the device 100 can cause damage on the actuation kinematic mechanism 101.

The aforementioned knock will have a component in the direction U of FIGS. 8 and 10. Such a knock (which, in accordance with what has been described above can also be an undesired movement/deformation) is essentially counteracted by a reaction force determined by the pressure with which the spring 30 pushes the ball 15 against the sleeve 16. The sizing and initial compression (preload) of the spring 30 are carried out so as to determine a predetermined threshold force.

In the operative condition of normal operation (i.e. when it is wished to carry out a gear-shifting), the tubular body 11 is associated with the tubular sleeve 16 in an operative position in which the ball 15 is housed in the seat 17a (FIGS. 3, 4, 6, 7 and 9).

When the knock is of a degree such that the spring 30 is subjected to a force below the threshold force, the spring 30 does not deform and the tubular body 11 stays in the aforementioned position with respect to the tubular sleeve 16. In this case the nut 10 behaves like a rigid body; therefore, a rotation of the drive shaft 122 causes a translation of the tubular sleeve 16 in the direction of the axle 123 (or direction B). The tubular body 11 is fixedly associated with the tubular sleeve 11 by means of the coupling between ball 15 and seat 17a and thus translates fixedly connected to the tubular sleeve 16. Such a translation causes the deformation of the actuation kinematic mechanism 101 (through variation of the length of the diagonal between the pin elements 106 and 107) and thus the movement of the chain and the consequent change of gear.

When, on the other hand, the knock is of a degree such that the spring 30 is subjected to a force above the threshold force, the spring 30 yields and the ball 30 moves from the seat 17a to the seat 17b, riding over the hill 17c. In this configuration, the tubular body 11 completely disengages from the tubular sleeve 16 along the direction of the axle 123, in the sense that the tubular sleeve 16 translates (due to the rotation of the drive shaft 122) along the direction of the axle 123 but does not take the tubular body 11 with it, which remains locked in the seat 17b but not fixedly connected to the tubular sleeve 16 along the direction of the axle 123. In this way a release configuration of the articulated kinematic mechanism 101 from the drive shaft 122 is achieved.

The aforementioned threshold force value is thus chosen so as to be certainly above the component along the axle 123 of the maximum stress occurring in the kinematic mechanism 101 during normal operation, but also certainly below the component along the axle 123 of the minimum stress from a knock capable of damaging a member of the kinematic mechanism 101 itself.

The behaviour of the nut 10 as a rigid body ensures the ready response of the kinematic mechanism following the actuation of the driving member 120. Should one wish to widen the operating range in which the system responds readily, the threshold force is advantageously chosen high. On the other hand, should one wish to allow the device 100 to absorb even small knocks, the threshold force is chosen with a lower value, although reducing the range in which the system responds readily.

It should be noted that the system described above is perfectly reversible, in the sense that starting from the release configuration (FIGS. 8 and 10) the user can restore the operative configuration of normal operation (FIGS. 7 and 9) by manually moving the tubular body 11 into the position in which the ball 15 is housed in the seat 17a. It should also be noted that the system described above allows the user, if and when desired, to manually activate the passage from the operative configuration of normal operation (FIGS. 7 and 9) to the release configuration (FIGS. 8 and 10). This can be useful, for example, before transporting the bicycle or if during use a malfunction of the gearshift occurs, to allow manual displacement of the derailleur.

What is claimed is:

1. Actuator device for a bicycle gearshift, comprising:
    an actuation kinematic mechanism adapted to be articulated in order to move a derailleur of the gearshift;
    a driving member adapted to control the articulation of the actuation kinematic mechanism, the driving member comprising a motor and a threaded drive shaft put in rotation by the motor;
    a nut associated with the actuation kinematic mechanism and with the drive shaft so that, in a first operative configuration of the actuator device, the nut is in an engaged condition with the drive shaft such that the rotation of the drive shaft causes the articulation of the actuation kinematic mechanism;
    wherein said actuator device further comprises a biased snap mechanism that holds the nut in said engaged condition under a predetermined threshold biasing force, and releases the nut such that the nut is drivingly disengaged from the drive shaft after said actuator device is subjected to a second force that overcomes the predetermined threshold biasing force and rotation of the drive shaft does not cause the articulation of the actuation kinematic mechanism.

2. Device according to claim 1, wherein the nut comprises: a tubular body provided with a first cavity extending along a first axis and with a second cavity extending along a second axis perpendicular to the first axis; two opposite pin portions, fixedly connected to the tubular body and extending along a third axis perpendicular to said first axis and to said second axis; a tubular sleeve, internally threaded, adapted to engage with the drive shaft and slidably inserted in the tubular body along said second axis; wherein said biased snap mechanism operates between the tubular body and the tubular sleeve along said first axis.

3. Device according to claim 2 wherein in said first operative configuration the biased snap mechanism holds the tubular body in a predetermined operative position with respect to the tubular sleeve and in said disengaged configuration the biased snap mechanism allows the tubular body to move freely from said predetermined operative position along said second axis.

4. Device according to claim 3 wherein said biased snap mechanism comprises: a ball at least partially housed in the first cavity of the tubular body; a preloaded spring, housed in the first cavity of the tubular body and acting on said ball to push it towards the tubular sleeve along said first axis; a first housing seat for said ball, provided in the tubular sleeve, said first housing seat being adapted to partially house the ball in said operative configuration; at least one second housing seat for said ball, provided in the tubular sleeve in a position adjacent to said first housing seat along said second axis, said at least one second housing seat being adapted to partially house the ball in said disengaged configuration.

5. Device according to claim 4 wherein said at least one second housing seat is defined by a groove extending along said second axis.

6. Device according to claim 4 wherein the first housing seat is separated from said at least one second housing seat by a raised portion of the tubular sleeve.

7. Device according to claim 3, wherein the tubular sleeve has an at least partially polygonal outer section, which matches a polygonal inner section of the tubular body.

8. Device according to claim 2 wherein said biased snap mechanism comprises: a ball at least partially housed in the first cavity of the tubular body; a preloaded spring, housed in the first cavity of the tubular body and acting on said ball to push it towards the tubular sleeve along said first axis; a first housing seat for said ball, provided in the tubular sleeve, said first housing seat being adapted to partially house the ball in said operative configuration; at least one second housing seat for said ball, provided in the tubular sleeve in a position adjacent to said first housing seat along said second axis, said at least one second housing seat being adapted to partially house the ball in said disengaged configuration.

9. Device according to claim 8 wherein said at least one second housing seat is defined by a groove extending along said second axis.

10. Device according to claim 9, wherein said groove has a length at least equal to half the length of the tubular sleeve.

11. Device according to claim 10 wherein the first housing seat is separated from said at least one second housing seat by a raised portion of the tubular sleeve.

12. Device according to claim 11 wherein said raised portion is connected to the first housing seat and to said at least one second housing seat through respective bevelled joining surfaces.

13. Device according to claim 10 wherein the tubular body comprises a pressure element sliding in the cavity and a cover for closing the cavity, the preloaded spring acting by thrusting between said pressure element and said cover.

14. Device according to claim 10, wherein the tubular sleeve has an at least partially polygonal outer section, which matches a polygonal inner section of the tubular body.

15. Device according to claim 9 wherein the first housing seat is separated from said at least one second housing seat by a raised portion of the tubular sleeve.

16. Device according to claim 15 wherein said raised portion is connected to the first housing seat and to said at least one second housing seat through respective bevelled joining surfaces.

17. Device according to claim 9, wherein the tubular body comprises a pressure element sliding in the cavity and a cover for closing the cavity, the preloaded spring acting by thrusting between said pressure element and said cover.

18. Device according to claim 9, wherein the tubular sleeve has an at least partially polygonal outer section, which matches a polygonal inner section of the tubular body.

19. Device according to claim 8 wherein the first housing seat is separated from said at least one second housing seat by a raised portion of the tubular sleeve.

20. Device according to claim 19 wherein said raised portion is connected to the first housing seat and to said at least one second housing seat through respective bevelled joining surfaces.

21. Device according to claim 20, wherein the tubular sleeve has an at least partially polygonal outer section, which matches a polygonal inner section of the tubular body.

22. Device according to claim 19, wherein the tubular sleeve has an at least partially polygonal outer section, which matches a polygonal inner section of the tubular body.

23. Device according to claim 8 wherein the tubular body comprises a pressure element sliding in the cavity and a cover for closing the cavity, the preloaded spring acting by thrusting between said pressure element and said cover.

24. Device according to claim 23 wherein the cover is associated with the tubular body through respective threadings and the position of said cover with respect to the tubular body is adjustable by screwing.

25. Device according to claim 24, wherein the tubular sleeve has an at least partially polygonal outer section, which matches a polygonal inner section of the tubular body.

26. Device according to claim 23 wherein the cover is associated with the tubular body through press fitting and the position of said cover with respect to the tubular body is unique and predetermined.

27. Device according to claim 23, wherein the tubular sleeve has an at least partially polygonal outer section, which matches a polygonal inner section of the tubular body.

28. Device according to claim 8 wherein the first housing seat is separated from said at least one second housing seat by a raised portion of the tubular sleeve.

29. Device according to claim 8, wherein the tubular sleeve has an at least partially polygonal outer section, which matches a polygonal inner section of the tubular body.

30. Device according to claim 2 wherein the tubular sleeve has an at least partially polygonal outer section, which matches a polygonal inner section of the tubular body.

31. Device according to claim 2 wherein the tubular sleeve, at an end portion thereof, comprises a removable closing cap.

32. Device according to claim 31, wherein the closing cap comprises an abutment collar adapted to prevent the tubular body from coming out at said disengaged configuration.

33. Actuator device for a bicycle gearshift, comprising:
an articulating actuation kinematic mechanism that moves a derailleur of the gearshift; a driving member that includes a motor and a threaded drive shaft that is rotated by the motor and controls the actuation kinematic mechanism;
a nut that is associated with the actuation kinematic mechanism and includes a biased snap mechanism having an engaged condition that holds the nut in engagement with the drive shaft so that rotation of the drive shaft causes articulation of the actuation kinematic mechanism, and, after the actuator device is subjected to a force greater than a predetermined threshold biasing force, the nut releases and is drivingly disengaged from the drive shaft where rotation of the drive shaft does not cause articulation of the actuation kinematic mechanism.

34. Actuator device for a bicycle gearshift, comprising:

an actuation kinematic mechanism adapted to be articulated in order to move a derailleur of the gearshift;

a driving member adapted to control the articulation of the actuation kinematic mechanism, the driving member comprising a motor and a threaded drive shaft put in rotation by the motor, the threaded drive shaft extending along and rotating about a first longitudinal axis;

a nut associated with the actuation kinematic mechanism and with the drive shaft so that, in a first operative configuration of the actuator device, the nut is in an engaged condition with the drive shaft such that the rotation of the drive shaft causes the articulation of the actuation kinematic mechanism, the nut extending along a second longitudinal axis that is perpendicular to the first longitudinal axis of the threaded drive shaft;

wherein said actuator device comprises a snap mechanism that, in said first operative configuration of the actuator device, holds the nut in said engaged condition and that, when the actuator device is subjected to a force greater than a predetermined threshold force, defines a release configuration in the nut wherein the actuation kinematic mechanism is completely released from the drive shaft such that the rotation of the drive shaft does not cause the articulation of the actuation kinematic mechanism.

* * * * *